Figure 1:
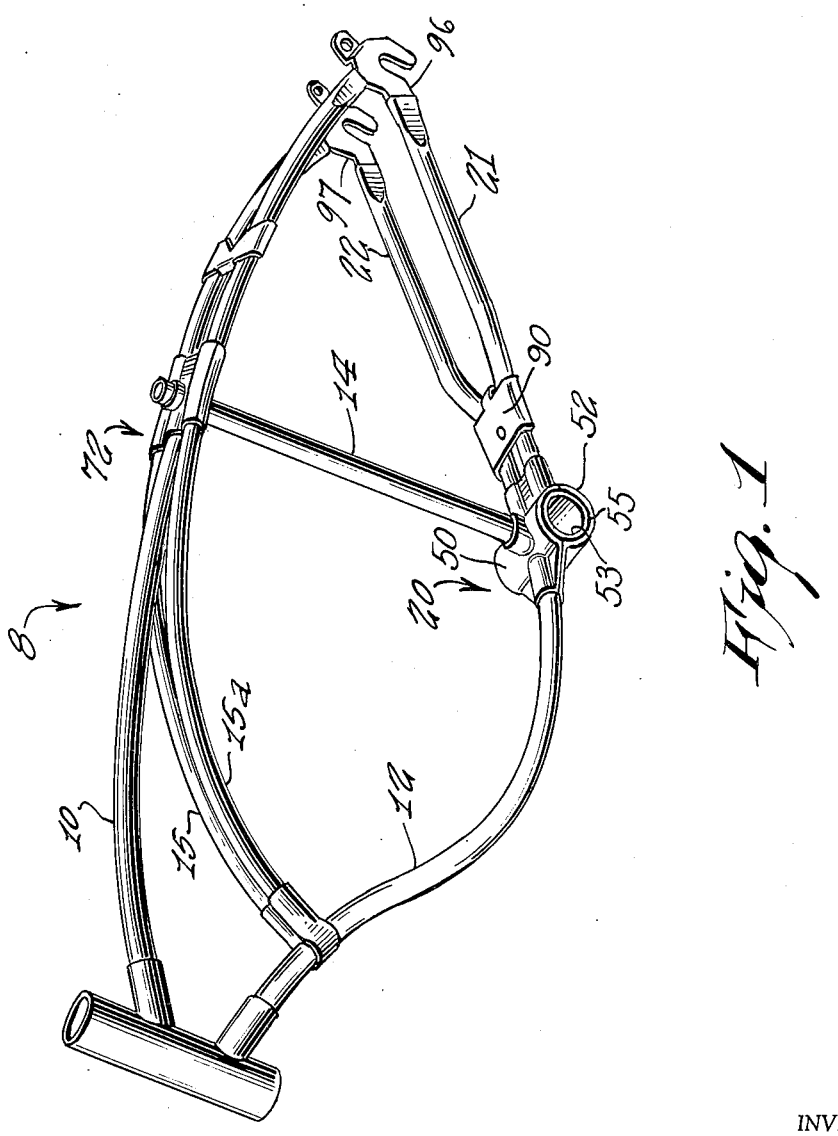

April 17, 1962     R. L. HOLLOWAY     3,030,124

BOND JOINTS FOR A BICYCLE FRAME

Filed Jan. 19, 1959     3 Sheets-Sheet 1

INVENTOR.
ROBERT L. HOLLOWAY
BY
ATTORNEY

April 17, 1962 R. L. HOLLOWAY 3,030,124
BOND JOINTS FOR A BICYCLE FRAME
Filed Jan. 19, 1959 3 Sheets-Sheet 2

INVENTOR.
ROBERT L. HOLLOWAY
BY
ATTORNEY

April 17, 1962 R. L. HOLLOWAY 3,030,124
BOND JOINTS FOR A BICYCLE FRAME
Filed Jan. 19, 1959 3 Sheets-Sheet 3

INVENTOR.
ROBERT L. HOLLOWAY
BY
Tennes Herstad
ATTORNEY ated Apr. 17, 1962

United States Patent Office 3,030,124
BOND JOINTS FOR A BICYCLE FRAME
Robert L. Holloway, Snyder, N.Y., assignor to American Machine & Foundry Company, a corporation of New Jersey
Filed Jan. 19, 1959, Ser. No. 787,561
5 Claims. (Cl. 280—281)

This invention relates to weldless tubular frame structures made from a plurality of tubular components, and in particular to such frames, and the method of making these, which comprise tubular components made of ferrous materials, such as steel, or non-ferrous materials, such as aluminum, bonded together by an adhesive substance.

Tubular frames thus bonded find application in the manufacture of wheeled vehicles, aircraft frames, supporting structures for radar antennas etc., where light weight, high stress resistance and durability are important considerations.

The method according to the invention has been found particularly well suited for joining the tubular elements of wheel goods such as bicycles and tricycles.

In the manufacture of wheel goods frames it has been customary heretofore to join individual tubular steel components by welding or brazing. The tubing making up such joints often had to be reinforced by metal inserts and there was much skill required not only in preparing the joint for assembly, but also in the welding and brazing operation. Even with this preparation and skill, such joints sometimes came apart when put to the normally expected strain and stress.

Difficulties have also been encountered in attempts to manufacture lightweight bicycle frames from aluminum alloy tube components because the welding of aluminum joints was a more difficult operation than ferrous welding or brazing.

Tubular structures employed in the manufacture of bicycles are necessarily thin. This poses the additional problem of strengthening the tubular elements at their joints, where these elements are subjected to greatest stress.

Furthermore, all such welding and brazing methods have been time consuming and costly, requiring expensive jig fixtures and special equipment.

Such equipment is normally available only at central manufacturing plants where the complete frames are assembled, then crated or packed for shipping to numerous distant destinations. Due to their bulk, when assembled, the frames take up a considerable amount of expensive shipping space.

It is therefore an important object of the invention to provide a tubular frame structure and a method of making the same, wherein the joints between the tubular elements are characterized by unusual strength and resistance to stresses.

Another object of the invention is to provide such frame structures wherein the tubular elements are joined by an adhesive substance rather than by welding or brazing.

Still another object of the invention is to provide tubular frame structures, wherein the tubular elements are reinforced at their joining points by tubular wrap-around sockets which receive the ends of the tubes.

Yet another object of the invention is to provide tubular frame structures of ferrous as well as non-ferrous materials, such as aluminum alloys and the like, which are bonded with an adhesive.

A further object of the invention is to provide tubular frame structures and a method of making the same, which do not require the employment of costly jig fixtures and special equipment for the assembly of the tubular components of which the frames are made.

Another object of the invention is to provide such tubular frame structure which may be compactly packed and shipped in disassembled condition distant locations where the frames may be easily assembled in local shops without special equipment, thus conserving shipping space and substantially reducing transportation expense.

Another object of the invention is to provide a tubular bicycle frame structure which may be easily assembled by the ultimate user without requiring special tools or skill, in the so-called "do-it-yourself" manner.

Another object of the invention is to provide a frame structure which is simple in construction, economical to manufacture, and which lends itself to mass production.

The invention is particularly adaptable in the manufacturing of bicycle frames, wherein all the aforesaid objects are of especial advantage.

These and other important objects of the invention will become apparent in connection with the following description and drawings wherein bicycle frames, to which the invention is particularly adaptable, have been selected to illustrate the method and embodiments of the invention.

Figure 2:
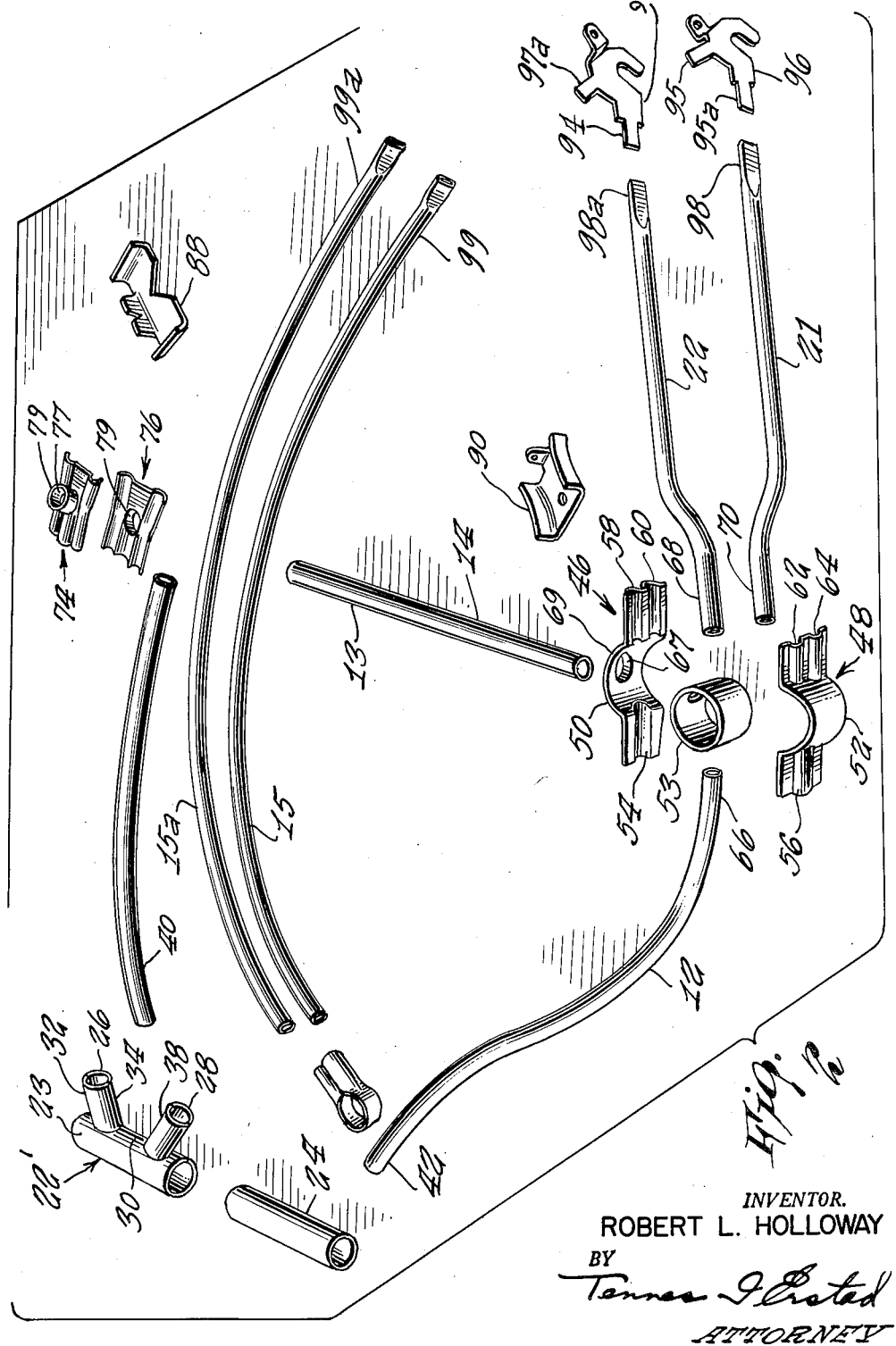
Figure 3:
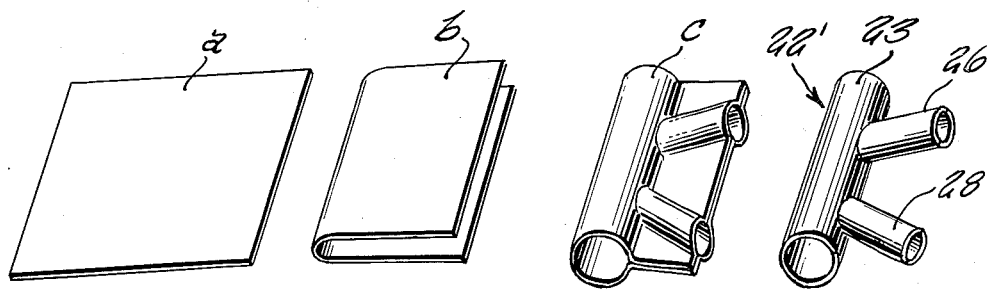
Figures 4, 5, 6:
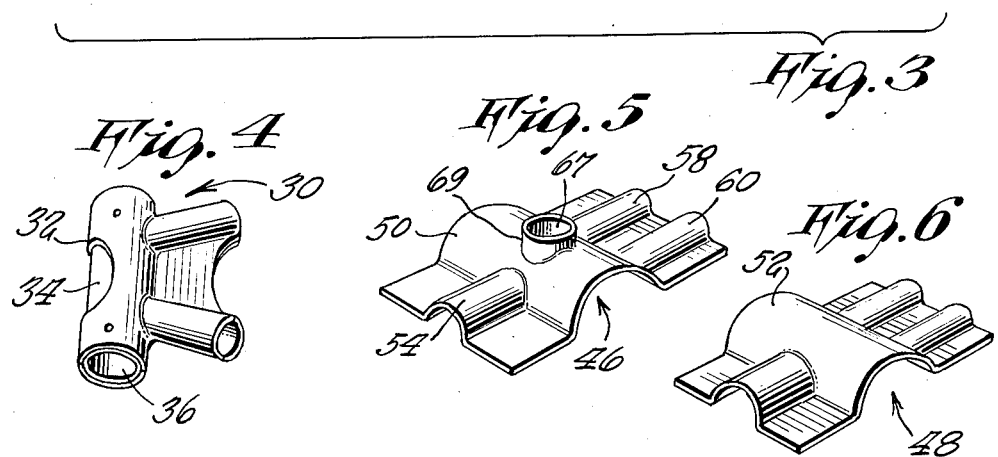
Figures 7, 8:
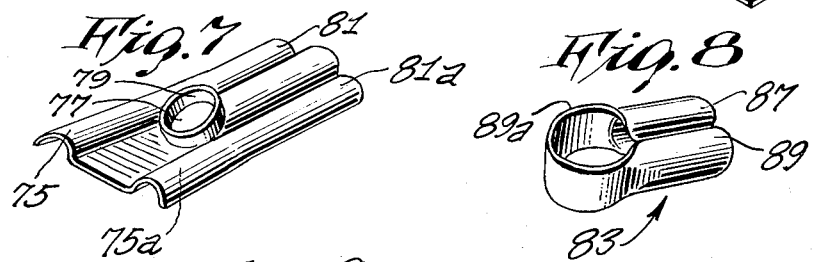
Figures 9, 10:
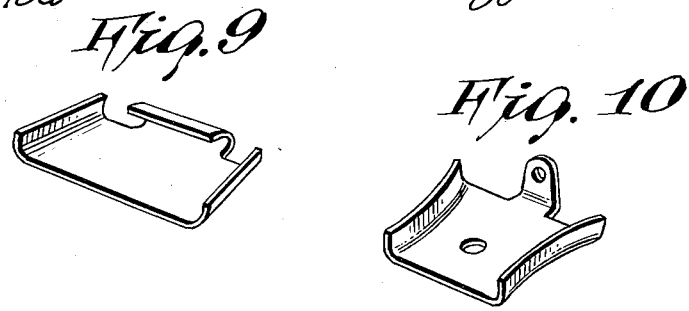

In the drawings, wherein like numerals indicate like parts throughout the same,

FIG. 1 is a perspective view of a bicycle frame assembled according to the invention, FIG. 2 is a view of the bicycle frame of FIG. 1 showing the components in disassembled condition, FIG. 3 illustrates the progressive stages of forming the steering post fitting and the completed fitting with wrap-around sleeves for receiving the forward ends of the lower and upper bars of a bicycle, FIG. 4 is a modified form of the fitting shown in FIG. 3, FIG. 5 is an enlarged detail view of one part of the bracket for receiving the rear end of the lower bar, the forward ends of the rear lower fork of the bicycle frame and the bicycle crankshaft bearing, FIG. 6 is an enlarged detail view of another part of the bracket described in FIG. 5, FIG. 7 is an enlarged detail view of a part of the bracket for joining the arcuate cantilever members, the rear end of the upper bar and the top of the seat post of the bicycle, FIG. 8 is an enlarged detail view of another bracket for securing the forward end of the cantilever members to the lower bar of the bicycle, FIG. 9 is an enlarged detail view of a clamp employed for securing a luggage carrier to the cantilever members of the bicycle, FIG. 10 is an enlarged view of a clamp for securing a kick stand to the bottom fork of the bicycle.

Referring now to the drawings in detail, there is shown in FIG. 1 a tubular bicycle frame 8 constructed in accordance with the method of the invention. The frame comprises an upper bar 10, a lower bar 12, a seat post 14, arcuate cantilever members 15, 15a, lower fork members 21, 22, a crankshaft housing generally designated as 20, and rear hub brackets 96, 97.

Because the method preferably employed in forming the fittings, by means of which the frame members are formed, is substantially the same irrespective of the size or contour of such fittings, reference will be made only to the forming of the fitting shown in FIG. 3. In this case, a blank "*a*" of sheet metal is formed into a shape "*b*" and further into a shape "*c*" and finally into a completed fitting 22'. The stamping machine (not shown) is equipped with dies designed to form the blank in these progressive stages. The making of dies for this and the other fittings employed in the assembly of the bicycle frame is well known to persons skilled in the art of diemaking.

The fitting 22', to receive a bushing 24 for the steering post of the bicycle (not shown), is formed with a main tubular sleeve 23 and is provided with laterally diverging wrap-around tubular sleeves 26, 28. Sleeve 23 has an inner diameter which is 5 to 10 mils larger than the outer diameter of steering post bushing 24, to permit the application of an adhesive layer of a thickness from 2½ to 5 mils between the inner face of the bracket on the outer face of the bushing, for bonding these to one another. Sleeves 26 and 28 are formed with an inner diameter which is also 5 to 10 mils larger than the outer diameters of forward ends 40, 42 of upper and lower bars 10 and 12, to permit the application of an adhesive therebetween. A modified fitting 30 is shown in FIG. 4. This fitting is provided with a cutout portion 32 which permits the display of a trademark or ornament affixed to bushing 34. As shown in FIGS. 5 and 6, there is further provided a two piece wrap-around fitting comprising parts 46 and 48. Each of the parts 46 and 48 is formed with semicylindrical complementary portions 50, 52 for receiving the bicycle's crankshaft bearing 53, and complementary laterally extending semicircular channels 54 and 56, 58 and 60, and 62, 64 for receiving the rear end 66, of the lower bar and forward ends 68, 70 of the lower fork members 21, 22. Part 46 is additionally formed with an opening 67 and a circular flange 69 for receiving the lower end of seat post 14. The inner diameters of semicylindrical portions 50 and 52 of channels 54, 56, 58, 60, 62 are so dimensioned that the fitting may be assembled about the tubular end of the bottom bar, bearing 53, forward ends 68, 70 of the lower rear fork members while leaving a clearance of 2½ to 5 mils between the adjacent surfaces of these parts for the adhesive bonding layer 55.

A two-part fitting 72 is formed as shown in FIG. 7 which illustrates one of the two similar parts 74, 76. Each part is complementary to the other and is provided with a circular opening such as 77, a flange such as 79 and sleeve halves, such as 75, 75a, and 81, 81a. The upper end 13 of the seat post is inserted through the circular openings and flanges of both parts of the fitting which are overlaid on the cantilever members 15, 15a.

A fourth wrap around fitting 83 is provided for attaching the cantilever members 15, 15a as shown in FIGS. 1 and 2. The fitting is formed with sleeves 87, 89 for receiving the forward ends of these members and with a sleeve 89a which fits over lower brace member 12.

Rear ends 99, 99a of cantilever members 15, 15a are formed with hollow flat portions which receive extensions 95 and 97a, respectively of rear hub retaining brackets 96, 97. Rear ends 98, 98a of rear fork members 21, 22 are likewise formed with hollow flat portions for receiving extensions 95a and 94 of the rear hub brackets.

There are provided on cantilever members 15, 15a and lower fork members 21, 22 clamps 88 and 90 which are adhesively bonded to these respective members as shown in FIG. 2. As in all other instances, the clearances between the inner faces of the fittings and outer faces of the tubular components may be approximately from 2½ to 5 mils. Clamp 88 serves for the attachment of a luggage carrier, while clamp 90 is used for securing a kick stand.

A method of assembling the bicycle frame may be as follows:

The inner contacting surfaces of the fittings and of the outer surfaces of the ends of the tubular frame members' ends as well as the outer surface of bushing 24, and rear hub brackets 96, 97 may be cleaned by any suitable pre-painting cleaning method. For example these parts may be cleaned by immersing these in an agitated mixture of 24 parts by weight of concentrated sulfuric acid, 7.5 parts of sodium dichromate and 68.5 parts water at 150° F. for 20 minutes. The parts are then rinsed in clear running water, followed by air-drying at room temperature and oven-drying at 150° F. for 30 minutes to remove all traces of moisture.

When framework components are to be shipped unassembled to a different location a suitable cleaning solution could be included with the shipment for the convenience of the assembler, for the particular metal used in the framework.

Any suitable adhesive may be used for joining the components together. Some are thermo-setting while others are cold-curing.

For example, Bond Master M688 manufactured by Rubber and Asbestos Corp. of 225 Bellville Avenue, Bloomfield, New Jersey, is one example of a non-thermosetting adhesive which employs a catalyst and requires no baking.

Another suitable adhesive would be Eastman 910 manufactured by the Eastman Chemical Products, Inc., a subsidiary of the Eastman Kodak Company, of Kingsport, Tennessee.

Another adhesive I have found to be satisfactory is an epoxy adhesive made by the Minnesota Mining and Manufacturing Co. and known as "3M Adhesive EC-1386" is applied to the surfaces to be joined by knife coating or by flowing the adhesive into place.

The tubular members and fittings are next laid out on a suitable supporting surface, as shown in FIG. 2.

Spacer threads, although not necessary, may be provided if desired to obtain optimum strength and positive control to allow a bonded adhesive layer thickness of approximately 2½ to 5 mils between the surfaces to be joined. Under this procedure 4 mil glass threads would be placed about the ends of the tubular members to support the edges of the bond and the tubes are inserted into and joined with their respective wrap-around sleeves, as will be evident from FIG. 2. Pressure is applied manually, suitable clamps being used where necessary. It is advisable to coat fresh cleaned surfaces with 3M adhesive EC-1386 within three hours after service preparation. The bonded joints are cured in a drying oven for one hour at 350° F. and 25-50 p.s.i.

Although I have described an adhesive which requires curing by heat, any other suitable cold curing adhesive substance capable of bonding metal to metal rigidly may be employed instead.

The other parts of the bicycle frame are joined in a similar manner.

Any metals such as brass, steel or aluminum may be employed to manufacture the frame and any suitable cleaning agent for the particular metal used may be employed.

Steel and aluminum tubing and fittings have been very successfully bonded by the method about described. It has been found that aluminum frame components show even greater bonded strength that those made of steel.

In extensive tests which were conducted with adhesive bonded frames it has been ascertained that the strength of the bonded joints exceeds that of similar welded or brazed joints.

While the invention has been described as related to an embodiment of a bicycle frame, it is to be understood that it is not limited to such an embodiment but may be used for vehicle frames, aircraft frames, radar antenna supporting frames, etc., and that various changes in the shape, size and arrangement of parts may be resorted to without departing from the spirit of the invention or the scope of the claims.

What is claimed is:

1. A bicycle frame comprising a tubular upper bar, a tubular lower bar, each bar having smooth forward ends and smooth rearward ends, the forward ends of said upper and lower bars being closer spaced than the rearward ends of said upper and lower bar, a first fitting formed with a main tubular sleeve for securing a steering post bushing therein and a pair of lateral spaced wrap-around reinforcing sleeves having smooth internal surfaces in which said forward ends are received, a seat post interposed between said rearward ends, second and third fittings formed with spaced wrap-around sleeves having smooth internal surfaces joining said rearward ends of the upper and lower bars, respectively, to said seat post, a pair of upper rear fork members and a pair of lower rear fork members having front and rear ends, said second and third fittings being provided with wrap-around reinforcing sleeves having smooth internal surfaces receiving a smooth intermediate portion of the pair of upper rear fork members and receiving the smooth front ends of the pair of lower rear fork members respectively, and a layer of thermosetting synthetic resin interposed between each of said sleeves and each of said respective members permanently and rigidly bonding said sleeves and said members.

2. The bicycle frame according to claim 1, wherein said rear ends of the fork members are formed as flat hollow portions with smooth internal surfaces, a pair of rear hub retaining brackets formed with smooth flat extensions received in said hollow portions, and a layer of thermosetting adhesive interposed between the flat hollow portions and the flat extensions permanently bonding the rear ends of the fork members to the rear hub retaining brackets.

3. The bicycle frame according to claim 2, further provided with a fourth wrap-around fitting for receiving the forward ends of the upper fork members, and a layer of thermosetting resin between said fourth wrap around fitting and said upper fork members rigidly and permanently bonding these together.

4. The bicycle frame according to claim 3, wherein said third fitting is formed with a transverse sleeve having a smooth internal surface for receiving a bicycle crankshaft bearing having a smooth outer surface in intimate engagement while providing clearance between the inner surface of said transverse sleeve and said bearing for a thin layer of synthetic resin adhesive to permanently bond the bearing to the sleeve.

5. A wrap-around fitting for the weldless bonding of a tubular seat post and a crankshaft bearing to tubular frame members of a bicycle, comprising a pair of upper and lower semicylindrical complementary parts adapted to receive said bearing, complementary sleeve portions extending laterally from said parts for receiving the tubular members, one of said semicylindrical parts having a circular opening defined by a flange portion for receiving the seat post, all said parts and portions being of a predetermined inner diameter slightly larger than that of the respective post, crankshaft bearing and the tubular members for the interposition of an adhesive permanently bonding layer therebetween.

References Cited in the file of this patent

UNITED STATES PATENTS

| | | |
|---|---|---|
| 614,905 | Sturges | Nov. 29, 1898 |
| 2,080,698 | Clark | May 18, 1937 |
| 2,151,533 | Schwinn | Mar. 21, 1939 |
| 2,153,249 | Henry | Apr. 4, 1939 |
| 2,229,526 | Shabacker | Jan. 21, 1941 |
| 2,274,961 | Horger | Mar. 3, 1942 |
| 2,378,961 | Wallace et al. | June 26, 1945 |
| 2,443,008 | Kraeft et al. | June 8, 1948 |
| 2,755,103 | Douglas | Mar. 9, 1953 |
| 2,847,340 | Joosten | Aug. 12, 1958 |
| 2,895,633 | Zellweger | July 21, 1959 |
| 2,928,446 | James et al. | Mar. 15, 1960 |

FOREIGN PATENTS

| | | |
|---|---|---|
| 617,311 | France | Nov. 19, 1926 |

OTHER REFERENCES

The Iron Age Magazine; August 19, 1943; pages 52 and 53.